United States Patent [19]

Vickary

[11] Patent Number: 5,393,190

[45] Date of Patent: Feb. 28, 1995

[54] APPARATUS FOR LIFTING AND TILTING HEAVY CONTAINERS

[76] Inventor: Coleman Vickary, R.D. #1, Box 320, Canajoharie, N.Y. 13317

[21] Appl. No.: 194,830

[22] Filed: Feb. 14, 1994

[51] Int. Cl.[6] .............................................. B65G 65/24
[52] U.S. Cl. .................................. 414/420; 414/758; 414/620; 187/226; 187/240
[58] Field of Search ............... 414/419, 420, 421, 758, 414/422, 620, 621, 303; 187/9 E, 8.5

[56] References Cited

U.S. PATENT DOCUMENTS

| | | | |
|---|---|---|---|
| 2,670,864 | 3/1954 | Hought | 414/420 |
| 3,191,788 | 6/1965 | Hopfeld | 414/620 X |
| 3,522,893 | 8/1970 | Yokich . | |
| 3,587,784 | 6/1971 | Tait | 187/9 E |
| 3,587,892 | 6/1971 | Vermette . | |
| 3,623,620 | 11/1971 | Vermette . | |
| 3,868,033 | 2/1975 | Le Duff . | |
| 4,056,207 | 11/1977 | Spilker | 414/758 X |
| 4,213,727 | 7/1980 | Lighthipe . | |
| 4,797,050 | 1/1989 | Habicht . | |
| 5,205,699 | 4/1993 | Habicht | 414/421 X |
| 5,207,550 | 5/1993 | Lehman | 414/420 |
| 5,257,890 | 11/1993 | Vickary | 414/420 |

FOREIGN PATENT DOCUMENTS 3242165  5/1984  Germany .

Primary Examiner—Michael S. Huppert
Assistant Examiner—Stephen Gordon
Attorney, Agent, or Firm—Schmeiser, Morelle & Watts

[57] ABSTRACT

Apparatus is disclosed for engaging, raising and rotating tanks/cylinders which contain liquids or gases under pressure. The apparatus comprises a cradle rotationally mounted on an elevator housing. While the tank/cylinder is elevated, an auto turn linkage in one embodiment of the apparatus assists in turning the cradle assembly by engagement with an indexing mechanism. Once the tank has been rotated 90 degrees, the indexing mechanism is locked in place, the auto turn linkage is released, and evacuation plumbing is affixed to the tank. The tank is then manually inverted for evacuation of the liquid.

7 Claims, 6 Drawing Sheets

APPARATUS FOR LIFTING AND TILTING HEAVY CONTAINERS

BACKGROUND OF THE INVENTION

1. Field Of The Invention

This invention generally relates to a mechanism which provides lifting and tilting for heavy containers, and more particularly to an elevatable cradle assembly which is adapted to turn gas cylinders such as propane or butane tanks.

2. Discussion Of Relevant Art

Numerous industries employ large containment vessels such as cryogenic fluids, propane, butane and other substances which, in most cases being volatile, are invariably contained within their containments in a liquid form under considerable pressure. Most of the containments have the general shape of cylinders, although in some cases cylindrical tanks, drums or barrels may be substituted with other shapes tending toward more cubical geometries. Irrespective of the containment type, withdrawal of the liquid contents is, in many cases, incomplete. In order to evacuate the remaining liquid contents or otherwise purge the containments, it has been found to be both expedient and economical to turn the containments, preferably by a 180° degree turn or an inversion, and thereby drain the remaining liquid contents while the inherent volatility of the liquids serves to increase pressure in the containments, thus helping to expel the remaining liquid content.

The prior art of devices for tilting or inverting tanks, drums, barrels and the like includes containment characterized by modern pressurized, gas-containing cylinders such as are used for propane or butane storage. It should be understood, however, that such continual reference is by no means meant to limit the invention as to its utility for inverting containments of practically any geometry or size such as would be reasonably encountered in using the mechanism and apparatus hereinafter disclosed.

U.S. Pat. No. 2,670,864, a COMBINED HOIST AND POURING STAND FOR CONTAINERS discloses a container by envelopment within a cupping framework. Thereafter it is hoisted by lifting the framework between two vertical uprights of a footed stand by use of a conventional winch. The footed stand, or podium as I choose to term such mechanisms, is asymmetrical having parallel elongate members extending toward the front of his apparatus. Once the cupping frame is sufficiently elevated, the container which has been hoisted therein is tilted forward in a portion of the cupping frame that is pivotally mounted to the major elevational frame work.

Throughout the art there have myriad disclosures of tilting apparatus that range from garbage can tilters to barrel inverters. Recently, there has been effort expended to provide gas tank inversion apparatus. The Pro-Chem Company of Middlesex, N.J., catalogues a "Model CE-420 Tank Inverter" which is made to tilt and "invert" LP-GAS cylinders in order to enhance either product evacuation or facilitate repair or maintenance. Utilizing one person operation, it consists mainly in a base assembly comprising a podium (such as discussed above) having thereon two vertical, rigid supports which pivotally engage a cradle of size sufficient to handle the referenced LP-GAS cylinders (which may range up to 420 lbs). The CE-420 is, however, a ponderous mechanism acquired at considerable investment and which tilts or "inverts" a cylinder in an unconventional fashion. The cylinder is engaged in the cradle at the front of the podium and, while strapped to the cradle, is inverted, not by a simple pivotation, but by a lifting up and "over-the-shoulder" maneuver which actually moves the cylinder center of gravity in an arcuate motion beginning at the front of the podium and terminating, in the air, proximate the rear of the podium. That such a maneuver exacts a near-180° inversion is not to be contested; however, it requires heavy duty framework, motive power, harness strengths and inherently unsafe maneuvering of the cylinder.

SUMMARY OF THE INVENTION

The present invention is an apparatus that provides all of the advantages sought by the prior art while almost totally eliminating the aforesaid disadvantages. The instant invention provides to the gas cylinder/tank industry an extremely simple, efficient, safe and positive means for totally evacuating the contents of the respective containments.

A first embodiment of the present invention (FIGS. 1–3) comprises in a base assembly, an elevator assembly, a cradle assembly and a few cradle adjunct mechanisms which are economically combined in a predominantly metal structural framework which is used to secure a container firmly while enveloping, by the cradle, lifting or elevating the containment above the firmament and, either simultaneously with or subsequently thereafter such elevating, rotating the cradle to a 180° position. Rotation takes place in plane that is orthogonal to the fore-aft axis of the base assembly and not, as in the relevant art, coplanar with the fore-aft axis. As given briefly above, the instant invention operates somewhat differently in its operational kinematics. This not only leads to a simplicity of design, but a design of considerable economy in that, since much of the tilting effort is had about an axis passing through the CG of the containment, very little effort need be expended in performing the pivotal (or rotational) maneuver. The elevating mechanism of the present invention is but a single column. Because of rotation in a plane orthogonal to the fore-aft axis, minimum torque is applied through the supporting post to the foremost extension of the podium (the base means) of the base assembly and elevator assembly. There is simply very little mass (comparatively speaking) that is cantilevered outward of the vertical support column because the rotational plane is held closely to that vertical column and turns about a shaft which is journaled in the elevator assembly.

In a second embodiment of the present invention (FIGS. 4–7), a cylinder turner is disclosed which assists in turning the cylinder to a 90° angle. Once the cylinder has been rotated to a 90° angle, the center of gravity of the liquid is positioned at a higher elevation than when the tank is in the vertical. Any subsequent tilting, in either direction, merely requires a smaller manual force because the center of gravity is being converted from a higher potential energy to a lower potential energy. While the cylinder is at the 90° angle, evacuation plumbing is attached to the cylinder. After the plumbing has been attached, the cylinder is manually pushed to its inverted position to begin evacuation.

The more distinctive features, as well as the minutiae, of the invention will be given in the Detailed Description of the Preferred Embodiment after a brief reference to the illustrative drawings contained herein.

DETAILED DESCRIPTION OF THE PREFERRED EMBODIMENT

The first embodiment of the present invention shows an apparatus for lifting and tilting heavy containers 10 which comprises a base assembly 12, an elevator assembly 20, a cradle assembly 30 and various adjunct mechanisms which are associated primarily with the cradle assembly, although not limited exclusively thereto. A definition of various features of the present invention are provided to familiarize the reader with various aspects of the preferred embodiments of the present invention.

Figure 1:
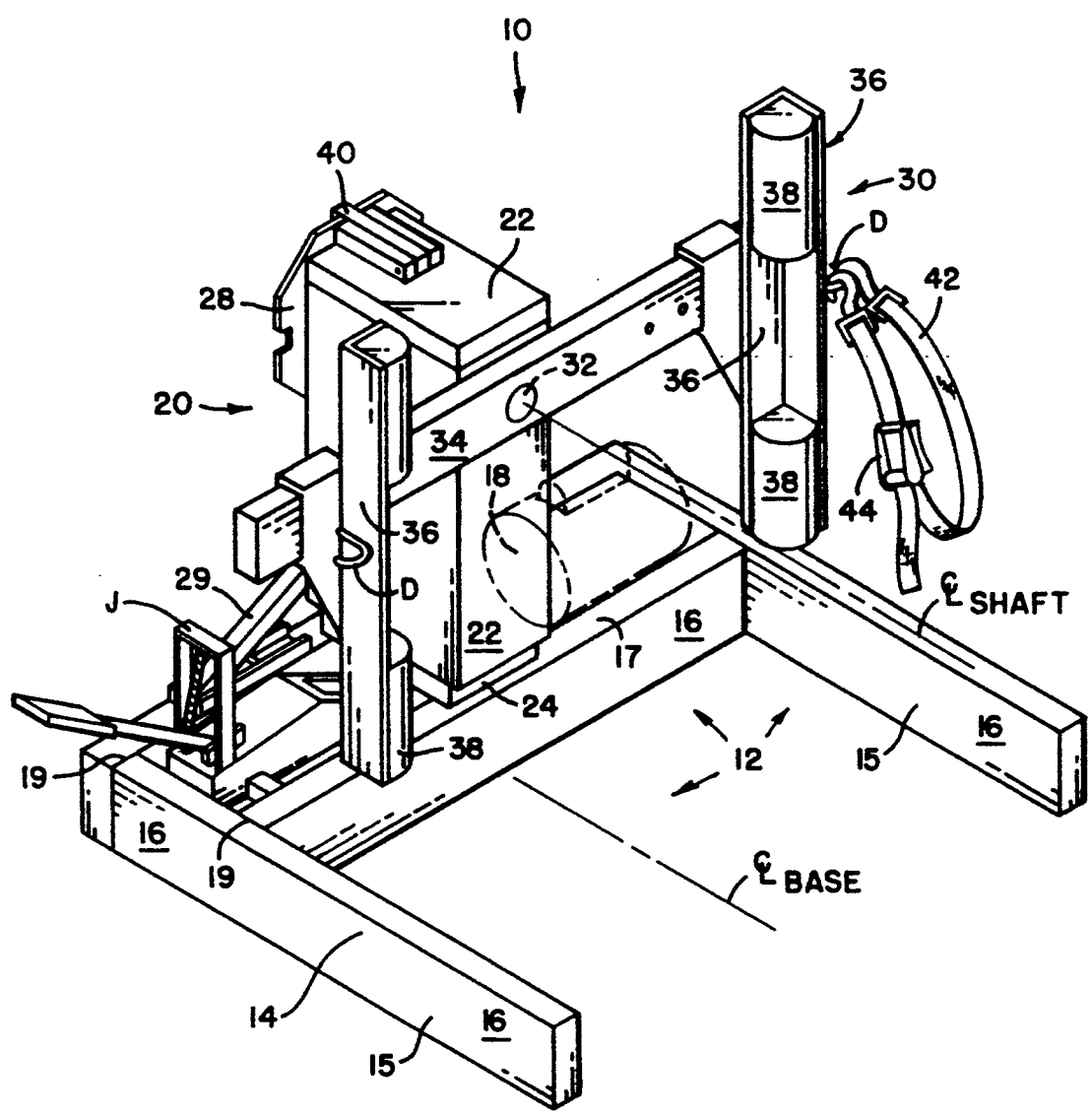
FIG. 1 is an isometric front oblique view of the first embodiment of the present invention in its lowered mode.

FIG. 1 shows the base assembly 12 which includes a base means 14 including of a podium 16 comprising a pair of elongate, parallel equal-length beams and a 90 degree transverse connector platform for joining the beam pair 34 at mutual ends of the individual beams 34 at a point proximate the rear of the podium 16; and an elevating mechanism 18 which is a hydraulic or electric and/or mechanical motivator including, rack and pinion or pawl and ratchet which are mounted to the podium and exert an upward force to a vertically moveable unit, case, housing or sleeve.

The elevator assembly is the combined mechanism which both secures the cradle assembly 30 and moves vertically, while being adapted to rotate. It includes a sleeve housing 22 which envelops a fixed support column 24 on which it rises and descends. This housing 22 secures rotating shaft 32 to rotational and indexing mechanisms 28. The fixed support column 24, is a vertical, rigid column which is mounted to the base assembly 12 and is slidingly enveloped by the sleeve housing 22. The indexing mechanism 28 is a plate centrally and perpendicularly mounted to the rear end of the rotating shaft 32. The lock bar 29 is a bar hingedly attached to the sleeve housing which drops to several positions near the vertical, including a vertical position against the fixed support column 24, as the housing 22 is raised and is adapted to receive a locking pin therethrough which completes a secure coupling between the housing-attached bar and the fixed straight support column, thus securing the housing in some raised position. The lock bar 29 is more properly termed an adjunct mechanism and variations for its securement are discussed hereinafter.

The cradle assembly 30 serves as a holder for the container 48 to be tilted or inverted. The parts of the assembly include: a rotating shaft 32 which is orthogonally mounted or journaled proximate the top of the sleeve housing 22 so that the shaft allows the cradle assembly 30 to pivot about shaft; a cradle beam 34 is orthogonally fixed to the forward end of the rotating shaft 32; while jaws or cross arms 36 serve as a pair of opposing, elongate 90° beam-mounted units that are jawlike and are translatable along the beam 34; and contact pads 38 which comprise four (or more) resilient fixed pads that are opposingly mounted, one at each end of each two jaw or cross arm 36 units.

Finally, adjunct mechanisms are employed and include primarily cradle equipment comprising, for example, jaw or cross arm-mounted "C" or "D" rings, strap and cinch equipment and various safety pins for immobilizing jaws with respect to the beam, index plate with respect to the housing and the housing safety lock lever with respect to the fixed support column. Alternatively, a track with locking lugs on the rearmost portion of the transverse connector platform are used oftentimes to secure the housing safety lock bar 29 when it is not in the vertical, against-the-support posture.

With an understanding of various features of the first embodiment of the invention, the reader shall more fully appreciate the following detailed description of the first embodiment, having reference to the drawings. Referring to FIG. 1, there is shown in isometric front oblique illustration of the present invention 10 in its lowered mode. FIG. 1 shows the base assembly 12. Within the base means 14, a podium 16 is comprised of a pair of elongate parallel, equal length beams 15 and a 90° transverse connector beam having platform beams 17 thereon. As can be seen, the platform beams 17 join the length beams 15 at joints 19 of the length beams 15, thus forming the podium 16 ensemble. An elevating or jacking mechanism J comprises an hydraulic jack mechanisms. It should be understood, however, that other means may be used for effecting an upwardly directed force which is to act on sleeve housing 22. Matters of this nature, however, are well known in the art and to spend additional time describing wherein a housing 22, emulative of a sleeve, may be caused or forced to rise on a vertical column or post 24 would belabor the brevity and simplicity of this disclosure. Suffice it to say that any mechanism, such as the instant jack J, hydraulic or electric motor means and/or mechanical means which include such common mechanisms as rack and pinion or pawl and ratchet, a winch, could also be made to provide a suitable elevating mechanism 18 as shown internal (in phantom) of the sleeve housing 22.

Figure 2:
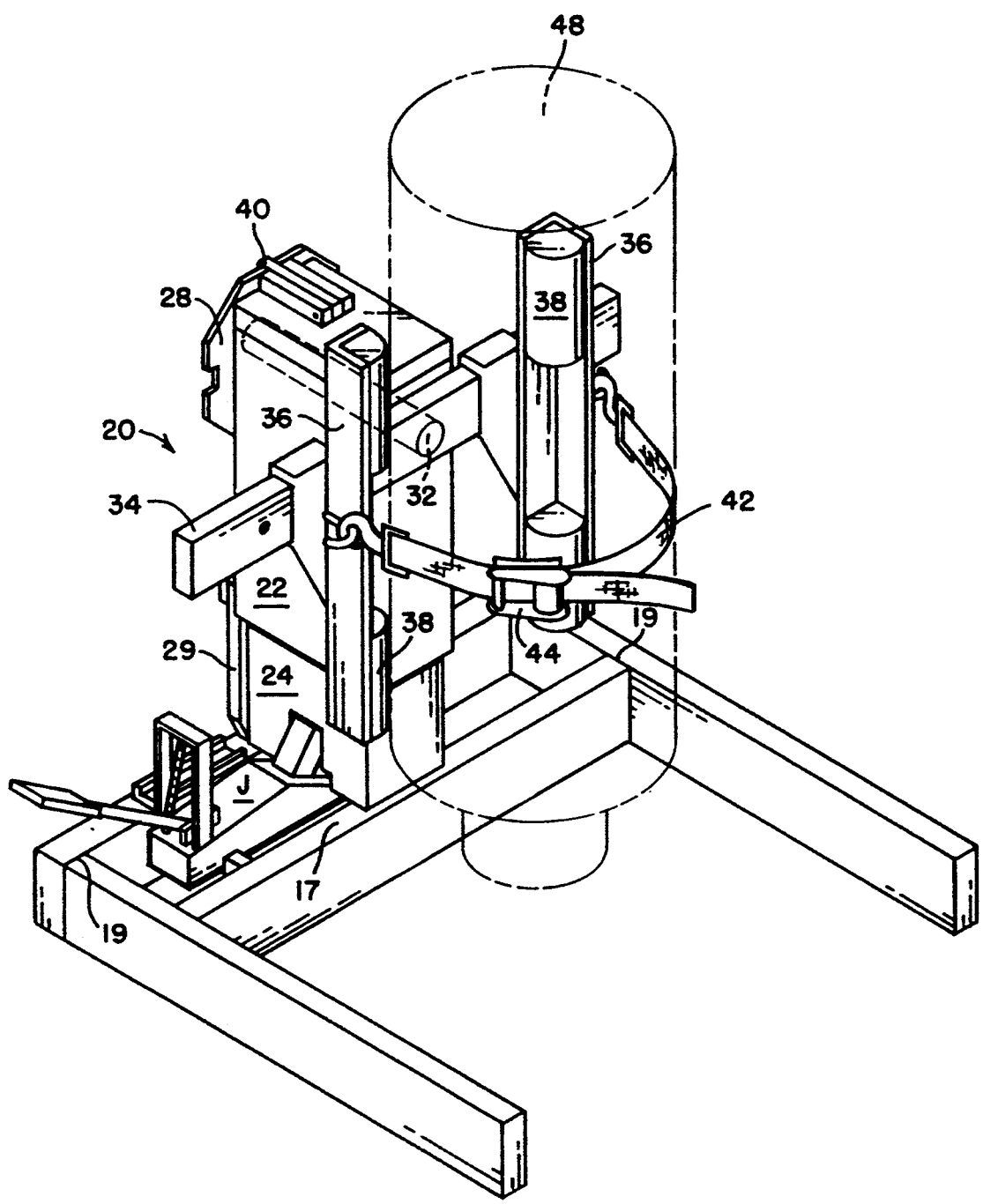
FIG. 2 is an isometric front oblique view of the first embodiment of the present invention in its elevated mode.
Figure 3:
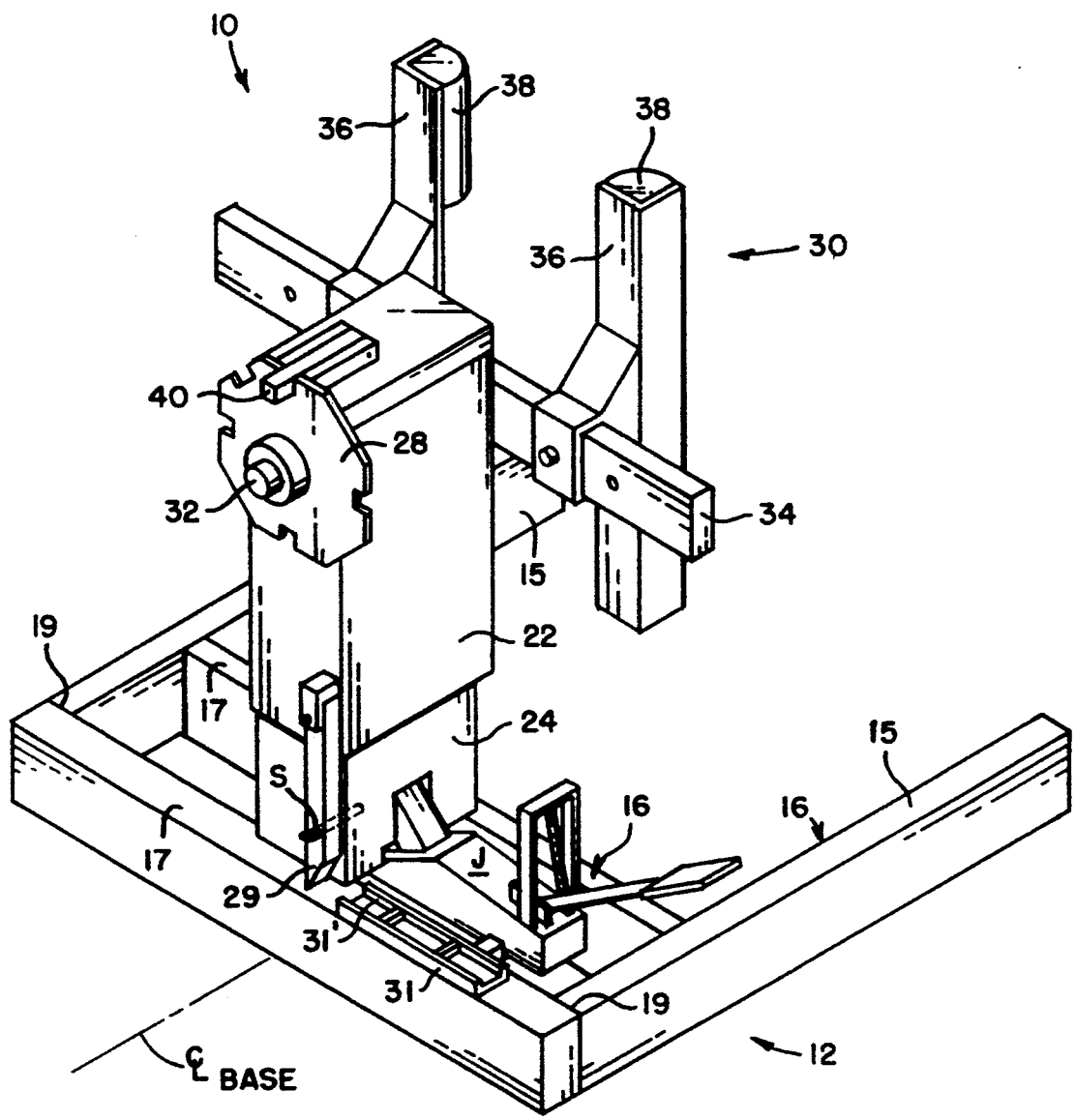
FIG. 3 is an isometric rear oblique view of the first embodiment of the present invention in its elevated mode.

The FIG. 2 representation, which is an isometric front oblique view of the invention in its elevated mode, serves to illustrate the salient portions of the elevator assembly 20. It may be seen that the fixed support column 24, a vertical, rigid and fixed column is mounted to the base means 14 and is slidingly enveloped by the sleeve housing 22 which rises vertically thereon. The sleeve housing 22, enveloping the fixed support column 24 on which it rises and descends, is the unit which contains a rotating shaft 32 that is associated with the cradle assembly 30. Although not shown herein, the rotational mechanism is partially disclosed by a phantom depiction of the rotating shaft 32, which comprises the principal element thereof. Other elements such as bearings and seals are omitted for the sake of clarity. Also absent from the FIG. 2 depiction, but present in FIG. 3 is an indexing means comprising an indexing plate 28 which is centrally and perpendicularly mounted to the rear end of rotating shaft 32. Remaining and adjunct elements of the elevator assembly comprise a lock bar 29 which will be more adequately discussed along with the exposition of FIG. 3.

Turning now to FIG. 3, there is disclosed in isometric rear oblique representation, the invention 10, in elevated mode. Lock bar 29 is seen depending hingedly from the sleeve housing 22. As the housing rises and the lock bar 29 is allowed to drop through several positions approaching the vertical, it may be set into a locking track 31 containing several locking lugs 31'. In the vertical position, the lock bar 29 may be safely secured to the fixed support column 24 by a safety pin S. Prominent in all three figures, but discussed in greater detail with FIG. 3 is the cradle assembly 30. This assembly 30 serves as the holding apparatus for the container 48 which is to be tilted or inverted. The cradle assembly 30 is similar to a yoke which engages an object of practically any shape. In FIG. 3 is shown an indexing plate 28 (with its several notches corresponding to 0°, 45°, 90° and 180°) indexing of the cradle assembly corresponds to the angle at which the tank or cylinder 48 is tilted. The rear portion of rotating shaft 32 is exposed in this view disclosing its central and perpendicular mounting to the index plate 28. Perpendicularly mounted to the forward end of the rotating shaft 32 is cradle beam 34. The indexing plate 28 and the beam 34 are rotatable about rotating ℄ shaft axis in coplanar relationship. Slidably mounted on and perpendicular to the beam 34 is a pair of opposing, elongate units termed jaws or cross arms 36. It may be readily seen that these are translatable along the beam and are fixed therealong by the insertion of pin or bolting mechanisms which utilize the series of holes shown at the rear of the beam 34. Final to the cradle proper are resilient, fixed pads, contact pads 38, which are opposingly mounted, one at each end of each two jaw units 36. Those of ordinary skill will recognize the contact pads as being necessary for the securement to the cradle of any of the predescribed containments in a manner that will not damage or harm such containments. Final to the FIG. 3 disclosure, the index (detent) bar 40 is seen hingedly mounted to the top of the sleeve housing 22. It is biased so that it will recess into any of the index slots that were previously mentioned, thereby securing the rotating shaft 32 and the entire cradle assembly 30 in a fixed position. Other minutiae and detail will be readily recognized by the routineer.

The tank 48 is set in the front of the apparatus as disclosed in FIG. 1 while the jaws/crossarms 36 are positioned equidistant from the rotating shaft center 32. The tank is pressed into the contact pads 38 and the sleeve housing 22 is adjusted so that the rotational axis of the rotating shaft 32 will pass through the nominal CG of the tank. The actual CG of a filled tank varies depending upon the liquid fill level of the tank. The tank (or pair of tanks) are now cinched into the cradle assembly 30 by use of high strength nylon webbings that are coupled to the D rings located at the forward faces of the jaws/crossarms 36. Any number of these D rings or similar apparatus may be used. The strap 42 may be of a conventional nylon webbed type or whatever may be safely used with the particular operation and product to which the strap is exposed. The strap 42 is then cinched around the tank(s) 48 and shanked using conventionally available apparatus such as over-center locking shanks cinches 44. Depending upon the length of the particular containments being inverted, more than one set of D rings and straps 42 may be used. Similarly, cinchable webbing (not shown) may also be affixed to the jaws/crossarms 36 for the purposes of securing one or more containments to the cradle assembly.

The second embodiment of the present invention is illustrated in FIGS. 4–7. The base assembly 112 includes a podium 116 and length beams 115 which are perpendicular to platform beams 117 and joined thereto at joints 119. The length beams 115 are positioned such that an open space 113 is disposed therebetween immediately below where the tank is adapted to be attached to the cradle assembly 130. The open space 113 provides an area free from obstructions during positioning the tank before securement to the cradle assembly 130 and during tilting operations of the tank. The platform beams 117 provide structural support for the elevator assembly 120 as well as a point of securement for the auto turn linkage 150.

Positioned above the base assembly 112 is the cradle assembly 130. The cradle assembly 130 includes a beam 134 which is mounted on a rotating shaft 132. On the beam 134, jaws or cross arms 136 are slidabley mounted. The cross arms 136 are slid laterally prior to mounting a cylinder thereon depending on the size of cylinder to be turned. Holes 133 are located along the beam 134 through which locking pins 135 are placed. Although a pin-hole locking mechanism is illustrated, other types of locking mechanisms are also contemplated such as wedging, ratchet, and camming type locks. Affixed to the distal ends of the cross arms 136 are contact pads 138.

Figure 4:
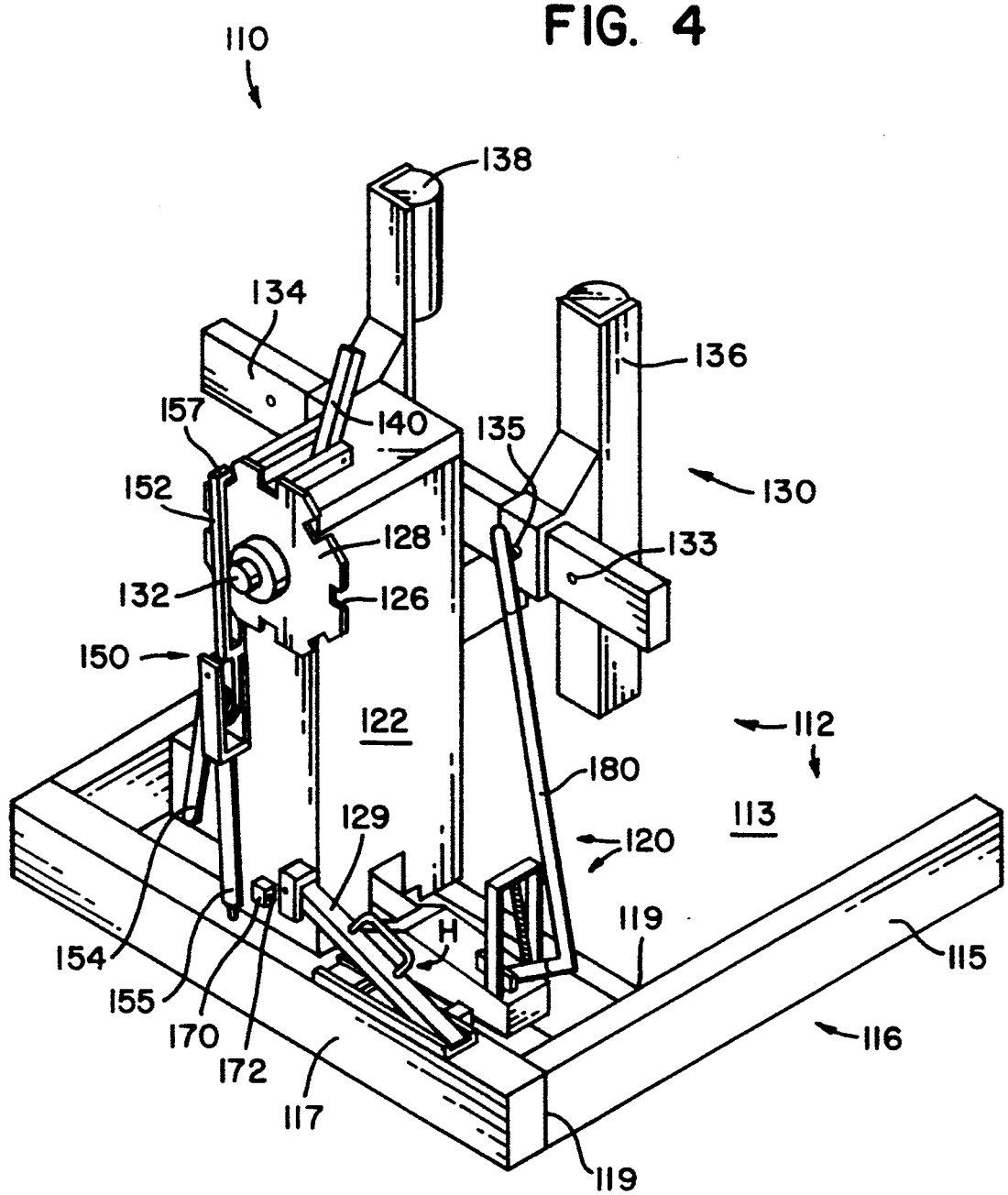
FIG. 4 is an isometric rear oblique view of the second embodiment of the present invention in its lowered mode.

The elevator assembly 120 secures the cradle assembly 130 to the base assembly 112. The elevator assembly 120 moves vertically, while allowing the cradle assembly 130 to rotate. The elevator assembly 120 includes a sleeve housing 122 which envelops a fixed support column 124 on which it rises and descends. This housing secures rotating shaft 132 to rotational and indexing mechanism 128. A fixed support column 124 is a vertical, rigid and fixed column which is mounted to the base assembly 112 and is slidingly enveloped by the sleeve housing 122. The rotational and indexing mechanism 128 for actuation and fixation of the rotating shaft 132 also includes indexing notches 126. A lock bar 129 is hingedly attached to the sleeve housing 122 which drops to several angular positions, including a vertical position against the fixed support column 124. The lock bar 129 is released from the raised position by handle H. The elevator assembly 120 is raised by jack mechanism J. The jack mechanism J may be operated by a foot pedal (FIG. 1) or a hand crank 180 (FIG. 4). The housing 122 is attached to the jacking mechanism J by a guide bar 170 which extends through a groove 174. The guide bar 170 is locked by locking pin 172.

The auto turn linkage 150 includes a catch arm 152, a yoke arm 155, and a lever handle 154. The catch arm 152 includes a catch 157 which is perpendicular to the catch arm 152. When engaged, the catch 157 on the catch arm 152 rests in an engagement notch 158 in one of the indexing notches 126. The catch arm 152 is pivotally attached to the lever handle 154 at pivot 151. The handle 154 is pivotally attached to the yoke arm 155 at pivot 153. Although a toggle-type lever handle system is illustrated as the auto turn linkage 150, other types of release handles or bars may be used, such as a turnbuckle.

The adjunct elements of the second embodiment are similar to and have been discussed in the first embodiment of the present invention. With an understanding of various features of the second embodiment of the invention, the reader shall more fully appreciate the following operation of the second embodiment, having reference to the drawings. FIG. 4 illustrates a device for lifting and tilting heavy containers 110 before a tank 148 is placed thereon. Before securement, the tank 148 is positioned into place and cross arms 136 of the cradle assembly 130 are properly adjusted and fixed into position by pins 135 through holes 133. Next, the tank 148 is strapped on and a chain and hook (not shown) is attached to prevent slippage of the tank 148 parallel to the cross arms 136 during inversion.

Figure 5:
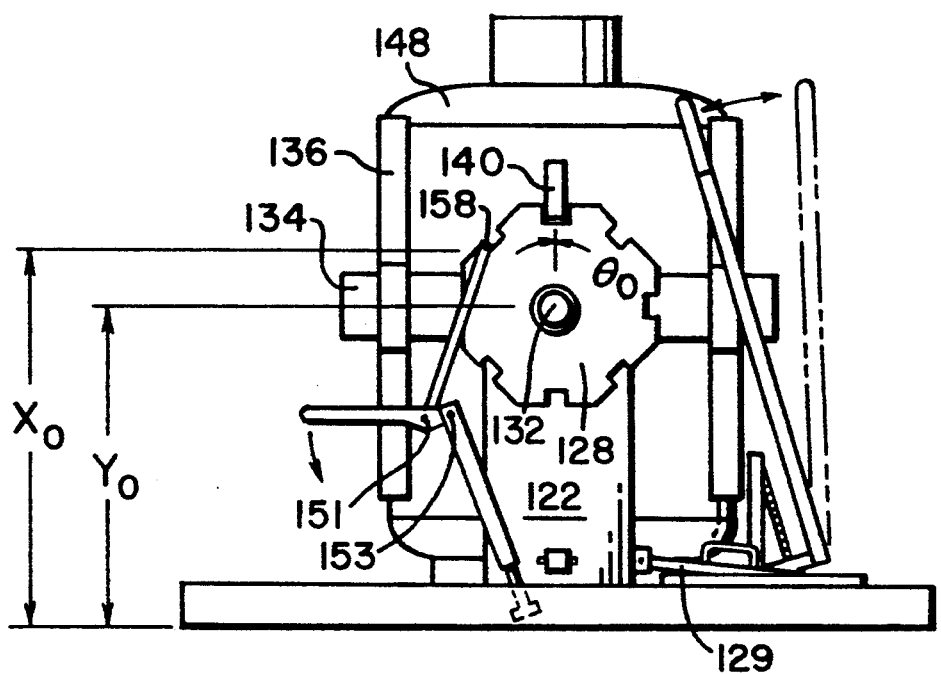
FIG. 5 is a side view of the second embodiment of the present invention in its lowered mode.

Once the tank 148 is fastened into place, the tank is prepared for elevation and rotation. The auto turn linkage 150 is placed in tension by attaching the catch 157 to the indexing mechanism 128 and rotating the handle 154 arcuately until it reaches a locked position. In the tank's initial position as shown in FIG. 5, the indexing mechanism 128 has an angular position $\theta_0$ of 0°, the catch 158 on the auto turn linkage 150 has a linear displacement from the bottom of the base assembly 12 of $x_0$, and the rotating shaft 132 has a linear displacement from the bottom of the base assembly 12 of $y_0$.

The jacking mechanism J is operated by handle 180. Upon lifting, the jacking mechanism J is pivotally engaged or positioned to lift the sleeve housing 122. As the handle is pumped, the jacking mechanism J causes the sleeve housing to ascend vertically for about 3 inches, without rotation of the tank. Once the tank has ascended about 3 inches, the auto turn linkage 150 becomes taut and the indexing mechanism 128 begins to rotate. It is important for the tank to ascend vertically for about 3 inches without rotation to provide adequate clearance for the bottom of the tank upon rotation.

During ascent of the sleeve housing, the lock bar 129 ratchets upwardly to provide stability to the sleeve housing 122 to thereby prevent vertical slippage due to gravity. The lock bar 129 may be released by handle H.

Figure 6:
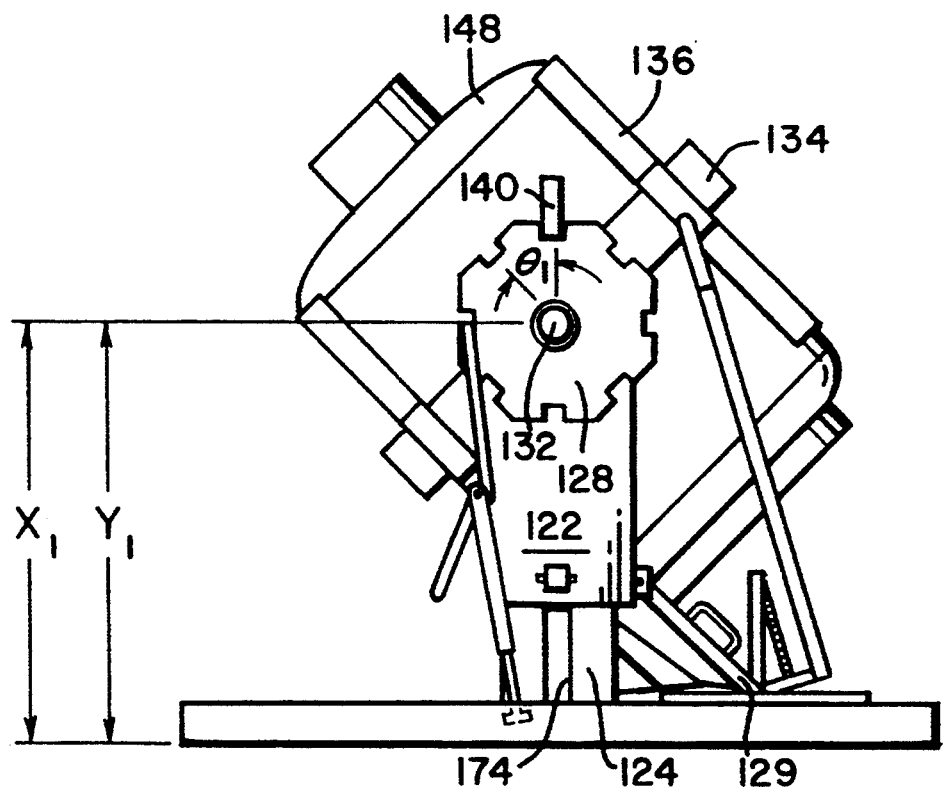
FIG. 6 is a side view of the second embodiment of the present invention after angular displacement in its raised mode.

FIG. 6 illustrates the indexing mechanism 128 at an angular position $\theta_1$ of 45°, the catch 158 on the auto turn linkage 150 has a linear displacement from the bottom of the base assembly 12 of $x_1$, and the rotating shaft 132 has a linear displacement from the bottom of the base assembly 12 of $y_1$. The distance $x_1$ is only negligibly shorter the distance $x_0$ due to the arcuate displacement of the catch 157 caused by the indexing mechanism 128. However, the distance $y_1$ is longer than $y_0$ due to the ascent of the sleeve housing 122.

Figure 7:
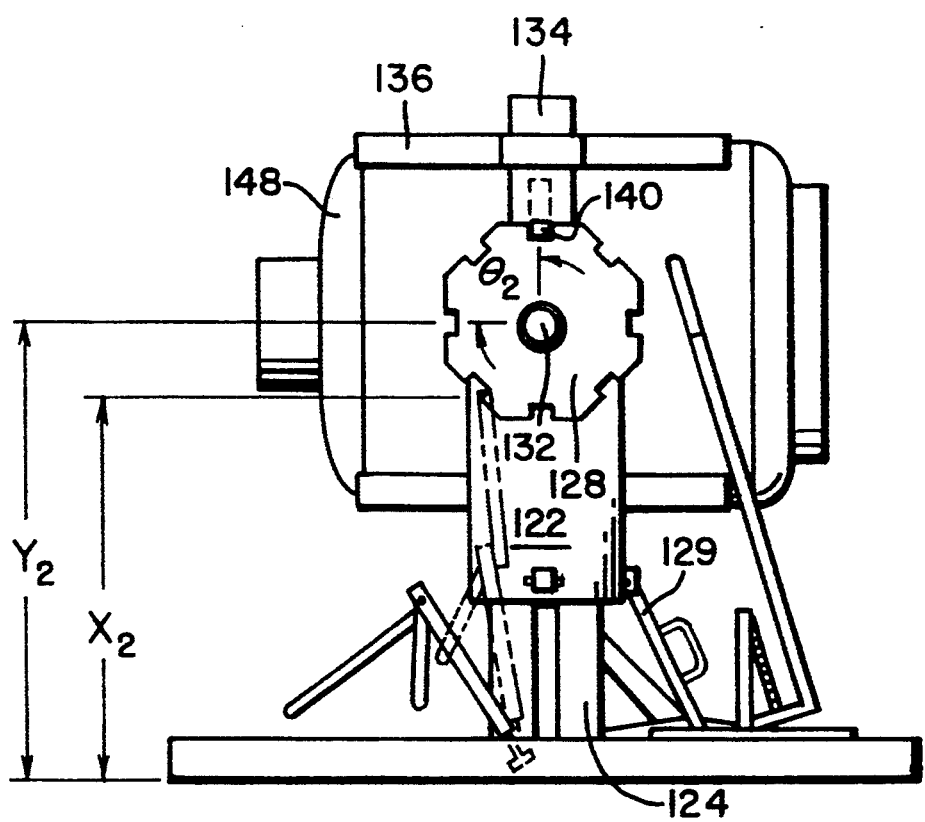
FIG. 7 is a side view of the second embodiment of the present invention in its final angular position in its raised mode.

FIG. 7 illustrates the indexing mechanism 128 at an angular position $\theta_1$ of 90°, the catch 158 on the auto turn linkage 150 has a linear displacement from the bottom of the base assembly 12 of $x_2$, and the rotating shaft 132 has a linear displacement from the bottom of the base assembly 12 of $y_2$. The distance $x_2$ is only negligibly longer than the distance $x_1$ and approximately the same as the distance $x_0$ due to the arcuate displacement of the catch 157 caused by the indexing mechanism 128. The distance $y_2$ is longer than $y_1$ due to the ascent of the sleeve housing 122.

As shown in FIG. 7, once $\theta_2$ has reached about a 90 degree angle, the indexing mechanism 128 is locked into place by the indexing bar 140. Once the indexing bar 140 is locked into place, the auto turn linkage 150 is disengaged and evacuation plumbing is attached to the tank 148. Attachment of the plumbing is much easier at the 90° position than after complete inversion. The lock bar 129 provides added stability to offset the gravitational force of the sleeve housing 122 and the tank 148. Once the plumbing is secured into place, the tank is manually inverted to an 180° position. The tank may be manually positioned, due to the fact the center of gravity of the liquid inside the tank has reached its highest position at 90°.

Those now familiar with the instant invention may conceive of several similar but different mechanisms which function as those disclosed or, additionally, choose to use varying means of motivation, perhaps even in the rotating shaft mechanism, thereby avoiding perhaps the use of the indexing plate and index bar. Such is certainly conceivable and may be readily accomplished without departing from the intent nor the spirit of the hereinafter appended claims.

I claim:

1. An elevatable and simultaneously rotatable cradle assembly for inverting heavy containers comprising:

a podium having a front and a back and which includes two parallel elongate beams that are joined by an orthogonal base platform at the back of said podium, and lug means for engagement with a pivotal drop bar suspended above the podium;

an elevator assembly comprising a single vertical support fixedly ascending from the center of said platform, a sleeve housing with closed top movably enveloping the support and a hydraulic jacking means for directing an upward projecting force to the sleeve housing in order to effect vertical movement of the sleeve housing on the support, and a pivotal drop bar hingedly connected to the sleeve housing and adapted for engagement with said lug means;

a pivotation mechanism comprising a rotatable shaft journaled in and proximate the sleeve housing top, the shaft journaled to align its axis of rotation axially parallel to a center line through the front and the back of the podium, said shaft mounted orthogonally with respect to the support;

an index plate centrally and perpendicularly fixed to the back end of the shaft, the plate bearing at least two peripheral notches adapted to receive therein a lock means;

a cradle assembly attached to a front end of the shaft, said cradle assembly further comprising an elongate beam fixedly secured and perpendicular to the front end of the shaft, at least two cross beams slidably mounted to the cradle assembly the elongate beam with means for fixedly securing the cross beams therealong and at least one D ring associated with each said cross beam for securing straps thereto, whereby an object being secured in said cradle assembly and elevated from its firmament therewith acquires rotatability in a plane orthogonal to said center line passing through the front and back of the podium; and a turn linkage having a first end connected to said pivotation mechanism and a second end connected to said podium.

2. A tilting and inverting apparatus for elevating an object and rotating it about its center of gravity comprising;

a base means having a defined front and a back, including a platform fixed proximate the back;

an elevator means comprising a vertical support shrouded by a moveable sleeve, the support fixedly secured to the center of the platform and the moveable sleeve having a defined top with a rotatable shaft journaled therein which is aligned parallel to a centerline which passes through the base means central to said front and back, said elevator means actuable by a mechanical motive means;

indexable rotation means comprising said shaft which further bears, on the back thereof, a fixed index means; and a cradle means, for securely holding a container, said cradle means comprising an elongate beam fixedly secured at its center and perpendicular to a front of the shaft, at least a pair of crossarms slidably mounted on the beam orthogonally thereto, said crossarms bearing on each a securing means for attaching straps thereto, whereby a centralized securement of an object in the cradle means and elevation thereof by the elevator means allows the object sufficient ground clearance to enable its pivotal inversion about its center of gravity in a plane orthogonal to the centerline axis; and a turn linkage having a first end connected to said indexable rotation means and a second end connected to said base means.

3. The apparatus of claim 2 wherein said motive means further comprises a jacking means.

4. The apparatus of claim 3 wherein said index means comprises a plate which has a plurality of fixed peripheral notches therein and is centrally and perpendicularly fixed to a back end of the shaft, said index means further comprising a lock bar means disposed and biased so as to normally fit into one of said plurality of notches, the lock bar secured fixedly at some point thereof to the sleeve.

5. The apparatus of claim 2 further comprising immobilization means for fixedly securing the slidably mounted pair of crossarms along the beam.

6. The apparatus of claim 5 wherein said securing means for attaching straps to said crossarms are attached individually to a crossarm and comprising a ring feature.

7. An improvement in tilting apparatus which allows complete inversion of a container while pivoting about its center of gravity in a rotational plane that is perpendicular to a footing pair of the apparatus and orthogonal to a defined fore-aft centerline, the improvement comprising;

a base having a platform and a pair of set-apart parallel feet extending horizontally outward, forward of and orthogonally therefrom;

a vertical support column enshrouded by a moveable sleeve, the column projecting upward of the platform center and the sleeve further containing therein and orthogonally projecting therethrough, a rotatable shaft, the shaft rotating on an axis coparallel with the extending feet, said shaft further comprising, at an end facing aft, an indexing means for securing said shaft in one of a plurality of rotational positions;

motivation means attached to the platform for urging the sleeve upward and controlling a subsequent descent; and a cradle comprising a framework disposed essentially in a plane orthogonal to the shaft and for securing therein a container, said cradle framework centrally and orthogonally fixed to the rotatable shaft over the feet, said cradle framework further comprising an elongate beam fixedly secured at its center and perpendicular to a front end of the shaft, at least a pair of crossarms slidably mounted on the beam orthogonally thereto, said crossarms bearing on each a securing means for attaching straps thereto, whereby container(s) secured in the cradle, when elevated by the motivation means are freely rotatable about a common CG in the cradle framework plane that is over and perpendicular to the feet, and when rotated may be temporarily secured by said indexing means in one of a plurality of rotational positions; and a turn linkage having a first end connected to said indexing means and a second end connected to said base.

* * * * *